Patented July 12, 1938

2,123,854

UNITED STATES PATENT OFFICE 2,123,854

POLY-NITRO COMPOUNDS OF 3-CYCLO-HEXYL-PHENOL

Lindley E. Mills, Frank B. Smith, and John Livak, Midland, Mich., assignors to The Dow Chemical Company, Midland, Mich., a corporation of Michigan No Drawing. Application July 9, 1936, Serial No. 89,766

1 Claim. (Cl. 260—143)

This invention concerns nitro derivatives of 3-cyclohexyl-phenol containing two and three substituting nitro groups in the benzene ring. We have prepared these products, determined certain of their physical properties whereby they can readily be identified, and have found them useful as insecticides.

The aforesaid new compounds can be prepared by the direct nitration of 3-cyclohexyl-phenol, e. g. (1) by warming 3-cyclohexyl-phenol with concentrated sulphuric acid to form a sulphonic acid derivative thereof and thereafter adding concentrated nitric acid to said sulphonic acid derivative, or (2) by dissolving 3-cyclohexyl-phenol in glacial acetic acid and adding concentrated nitric acid thereto at temperatures between −10° and 20° C.

The following examples describe the new nitro derivatives and their preparation, but are not to be construed as limiting the invention:—

Example 1

A mixture of 24.5 grams (0.14 mol.) of 3-cyclohexyl-phenol and 50 milliliters (0.9 mol.) of 95 per cent sulphuric acid was heated in a glass-lined vessel with agitation and at a temperature of 60° to 70° C. for 1.5 hours. The resultant product was poured into 250 milliliters of water, the clear sulphonic acid solution so formed cooled to a temperature of approximately 65° C., and 60 milliliters (0.95 mol.) of 70 per cent nitric acid added slowly thereto over a period of 45 minutes, while the reaction mixture was rapidly agitated and maintained at a temperature between 65° and 70° C. The resulting suspension of crystals was then stirred for 15 minutes at 70° C. and thereafter at 90° C. for 45 minutes. The mixture was finally cooled to 30° C. and filtered, and the crystals washed with water and air dried, whereby 32 grams of nitrated product melting at 107°–113° C. was obtained. This material was recrystallized from ethyl alcohol to obtain 2,4,6-trinitro-3-cyclohexyl-phenol as a nearly white crystalline solid melting at approximately 134.5°–135° C. and having the formula

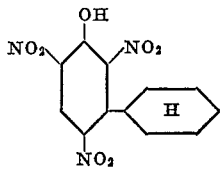

This compound darkened upon exposure to light and decomposed on attempted distillation under reduced pressure. It is soluble in most organic solvents and dilute aqueous caustic alkali solutions, but substantially insoluble in water.

Example 2

44.0 grams (0.25 mol.) of 3-cyclohexyl-phenol was dissolved in 50 milliliters of glacial acetic acid and cooled to 0° C. in an ice bath. A mixture of 56.3 grams (0.62 mol.) of 70 per cent nitric acid and 25 milliliters of glacial acetic acid was slowly added to the 3-cyclohexyl-phenol solution over a period of 45 minutes, the temperature being maintained below 10° C. during the addition. The temperature of the reaction mixture was then gradually raised to 34° C. over a period of 30 minutes, after which the mixture was allowed to stand at room temperature for 12 hours. This nitration mixture was diluted with 200 milliliters of water to precipitate a brown oil, the oil collected, washed successively with dilute aqueous sodium carbonate solution and water, and dried to obtain 56.7 grams (0.213 mol.) of a mixture of the isomeric dinitro-3-cyclohexyl-phenols having the specific gravity 1.281 at 20°/4° C., and probably the formula

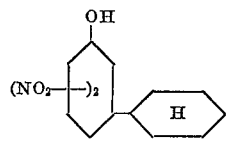

This isomeric mixture was in the form of a viscous yellow-brown oil substantially insoluble in water, soluble in most organic solvents and dilute aqueous caustic solution, and decomposing on attempted distillation under reduced pressure. Analysis showed a nitrogen content of 10.48 per cent by weight, which corresponds very closely to theory of 10.56 per cent.

A mixture of equal parts by weight of the above described 2,4,6-trinitro-3-cyclohexyl-phenol and isomeric dinitro-3-cyclohexyl-phenol derivatives was tested as an insecticide against Aphis rumicus L. In making this test 1.0 gram of the mixture was dissolved in 99 grams of a light lubricating oil and the resulting solution emulsified with water to form a spray composition comprising 0.5 per cent by weight of the oil-nitro-phenol solution. This solution was tested against aphids, giving a control of 97.5 per cent, as compared with 44.5 per cent for the oil alone.

Other modes of applying the principle of our invention may be employed instead of those explained, change being made as regards the method or compounds herein disclosed, provided the compound stated by the following claim be obtained.

We therefore particularly point out and distinctly claim as our invention:—

2,4,6-trinitro-3-cyclohexyl-phenol.

LINDLEY E. MILLS.
FRANK B. SMITH.
JOHN LIVAK.